(12) United States Patent
McMillon et al.

(10) Patent No.: US 12,130,934 B2
(45) Date of Patent: Oct. 29, 2024

(54) MANAGING MACHINE-LEARNING MODELS VIA NON-FUNGIBLE TOKENS ON A DIGITAL LEDGER

(71) Applicant: Halliburton Energy Services, Inc., Houston, TX (US)

(72) Inventors: Christopher M. McMillon, Humble, TX (US); Fahad Ahmad, Cypress, TX (US); Daniel Antonio, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 258 days.

(21) Appl. No.: 17/709,056

(22) Filed: Mar. 30, 2022

(65) Prior Publication Data

US 2023/0315877 A1    Oct. 5, 2023

(51) Int. Cl.
G06F 21/00      (2013.01)
G06F 21/62      (2013.01)
G06N 20/00      (2019.01)

(52) U.S. Cl.
CPC ......... *G06F 21/6209* (2013.01); *G06N 20/00* (2019.01)

(58) Field of Classification Search
CPC ...... G06F 21/6209; G06F 21/64; G06N 20/00
See application file for complete search history.

(56) References Cited

U.S. PATENT DOCUMENTS

| | | | |
|---|---|---|---|
| 11,443,838 B1 * | 9/2022 | Cordonnier | ............ H04L 9/0816 |
| 2020/0311816 A1 * | 10/2020 | Calvin | ...................... H04L 9/50 |
| 2021/0248523 A1 | 8/2021 | Wick | |
| 2021/0295324 A1 | 9/2021 | Kerseboom et al. | |
| 2021/0406920 A1 * | 12/2021 | McLaney | ............. G06Q 20/389 |
| 2022/0391850 A1 * | 12/2022 | Morris | ...................... H04L 9/50 |
| 2023/0120897 A1 * | 4/2023 | Kozlowski, III | .... G06Q 50/184 |
| | | | 705/75 |

FOREIGN PATENT DOCUMENTS

WO      2020092900 A2      5/2020

OTHER PUBLICATIONS

El-Berawi et al., "performing hydrocarbon extraction using NFT identifier to train machine learning model", (IJACSA) International Journal of Advanced Computer Science and Applications, vol. 12, No. 12, (Year: 2021).*
International Search Report and Written Opinion, PCT/US2022/022621, Dec. 6, 2021, 11 pages.
Unpublished U.S. Appl. No. 17/,505,022, filed Oct. 19, 2021, In accordance with the Waiver of Requirements in 37 CFR 1.98 for Cited Pending U.S. Patent Applications, 1287 O.G. 163 (Oct. 19, 2004), the cited, unpublished US Patent Application is available in the IFW and, therefore, not provided.

\* cited by examiner

*Primary Examiner* — Morshed Mehedi
(74) *Attorney, Agent, or Firm* — Kilpatrick Townsend & Stockton LLP

(57) ABSTRACT

Some examples described herein relate to generating a non-fungible token on a distributed ledger, where the non-fungible token represents a machine-learning model for use in performing hydrocarbon extraction operations. The non-fungible token can also include one or more identifiers of one or more training datasets used to train the machine-learning model.

20 Claims, 6 Drawing Sheets

MANAGING MACHINE-LEARNING MODELS VIA NON-FUNGIBLE TOKENS ON A DIGITAL LEDGER

TECHNICAL FIELD

The present disclosure relates generally to machine-learning models and their training data. More specifically, but not by way of limitation, this disclosure relates to using non-fungible tokens (NFTs) stored on a digital ledger, such as a blockchain, for controlling ownership of and access to machine-learning models based on various factors, such as contributions of training data for training the machine-learning models.

BACKGROUND

Non-fungible tokens (NFTs) have recently grown in popularity. An NFT is a unique object such as a cryptographic token, which is recorded on a digital ledger to represent a unique physical or digital asset. NFTs each have their own unique information and attributes, so they are not mutually interchangeable with other NFTs. This makes NFTs different from fungible assets like cryptocurrencies, in that fungible assets are identical to each other and therefore can be traded or exchanged as identical units.

Machine-learning models have also recently grown in popularity. A machine-learning model can be an algorithm that is trained using training data to make predictions or decisions. The machine-learning model may detect patterns within training data and these patterns may be used to make predictions or decisions in relation to new data.

DETAILED DESCRIPTION

Figure 1:
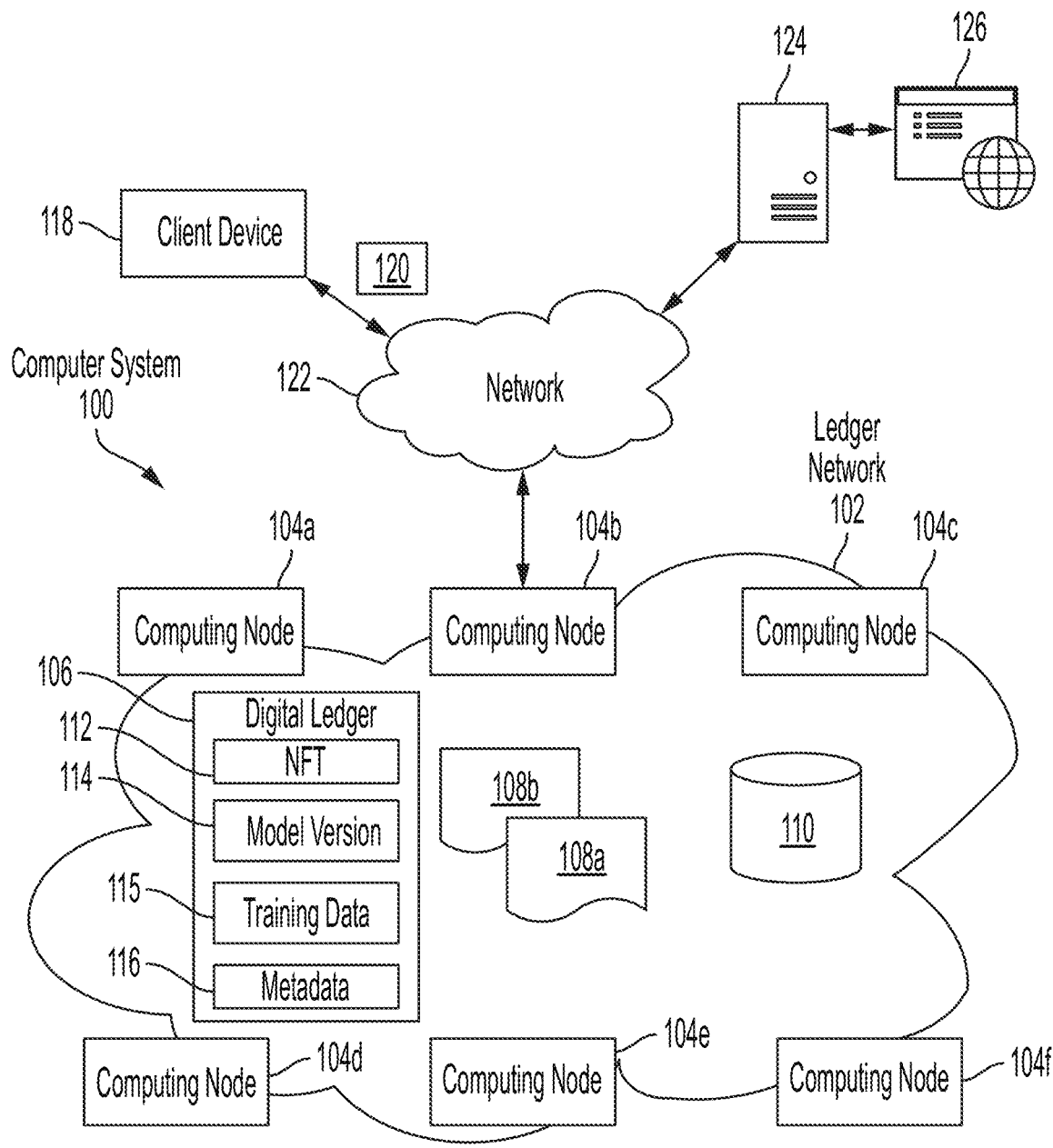
FIG. 1 is a block diagram of an example of a computer system for implementing a digital ledger according to one example of the present disclosure.

Certain aspects and examples of the present disclosure relate to representing machine-learning models using non-fungible tokens (NFTs) stored on a digital ledger. Given the uniqueness of each NFT, NFTs can be used in some examples as certificates of authenticity and proof of ownership for machine-learning models. Because machine-learning models may require training data to adapt and effectively make predictions, ownership of a particular version of a machine-learning model may be apportioned among providers of the model and providers of the training data. This partial ownership may then be used to control access to the model.

Controlling access to machine-learning models can become increasingly challenging. For example, machine-learning models are constantly evolving through iterative training and version upgrades (e.g., upgrades to the underlying architecture of the models themselves). Many different entities may contribute to improving a machine-learning model, for example by supplying training datasets and software changes. It may be desirable to automatically control access to a machine-learning model based on the contributions to the model by different entities. But, reliably tracking which entities have contributed to a currently operable version of a machine-learning model and how they have contributed can be difficult using conventional techniques. Some examples of the present disclosure can overcome one or more of these problems by automatically, securely, and accurately tracking contributions to model development using non-fungible tokens on a digital ledger, such as a blockchain.

Also, controlling access to a model using older technologies such as passwords or sixteen-character product keys may be inadequate. For example, they may not have the flexibility to dynamically manage an ever evolving set of access rights, wherein legitimate access to a machine-learning model may constantly be shifting for numerous reasons, such as subscriptions lapses and various contributions to the model. But some examples of the present disclosure can more dynamically control access rights through automatic updates to the digital ledger and one or more smart contracts. A smart contract is a self-executing contract or self-enforcing agreement in the form of executable program code, which may reside on the digital ledger or in another location such as a database. A smart contract can be automatically executed by the network of computer nodes that is hosting the digital ledger in response to certain events, such as when predetermined terms and conditions are met or when an agreement is reached between participating parties.

Some examples may also allow an entity to obtain access to a model in exchange for receiving data gathered during the use of the model as training data to improve the model. An example of this may be an extraction entity drilling to extract hydrocarbons and then providing an oilfield service entity with drilling data, which may be used to improve the oilfield service's machine-learning model. In exchange for providing the drilling data, the extraction entity can be allowed to access and use the machine-learning model to guide the extraction entity's drilling operations. In some examples, the method could add potential ways of honoring data sovereignty with machine learning models. By branching the data models, it may be possible to import data and enhance the models without exporting data.

Additionally, tracking partial ownership may allow effective intellectual property control over versions of a similar machine-learning model trained on different data sets from different providers. An example of this may be an entity providing a training data restricting use of a version of a machine-learning model trained with the entity's dataset.

As noted above, a digital ledger can be used to implement various aspects described herein. A digital ledger can be a distributed database that is duplicated and shared across a network of computer nodes that collectively validate (e.g., approve or reject) transactions. This collective validation can improve the security and reliability of the digital ledger. One example of such a distributed ledger can include a blockchain, though other types of distributed digital ledgers are possible. A blockchain is a shared, decentralized digital ledger that can facilitate the process of recording transactions and tracking asset ownership. A blockchain contains a sequential series of immutable records referred to as "blocks.' Each block is distinct from the block before it and linked to the prior block via a hashed pointer, thereby creating a sequential chain of blocks or "blockchain." The immutability of the blocks allows the blockchain to serve as a trusted record of transactions.

In some examples, ownership can be tracked using the digital ledger, such as a blockchain, that stores information in blocks relating to the model's properties and functionality at different points in time. Such information may include some or all of the model itself, some or all of the training data used to train the model, inputs to the model, and outputs from the model based on the inputs. One or more points in the history of the model can be attributed back to blocks in the digital ledger, where each block may store information relating to the model at a particular point in time. The information in the bockchain block can then be audited for ownership and verified.

In one specific example, a first dataset can be used to create a first model. If a first entity owns the first model, the first model can be entirely owned by the first entity. If a second dataset is then provided by a second entity to further train the first model and thereby produce a second model, ownership of the second model can be traced back to and apportioned among the first and the second entity. This can provide a model that can be used and shared knowing the source of the data.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of a computer system 100 for implementing a digital ledger 106 according to one example of the present disclosure. The computer system 100 can include any number and combination of computing nodes, such as computing nodes 104a-f. Examples of the computing nodes can include desktop computers, servers, and specialized mining computers such as application-specific integrated circuit (ASIC) miners. The computing nodes can collectively implement a ledger network 102 to host the digital ledger 106, which in this example is a distributed digital ledger. The computing nodes 104a-f may be distributed among and operated by one more participants of the ledger network 102, such as various companies associated with the oil and well industry.

The digital ledger 106 can provide an immutable record related to ownership of machine-learning model versions 114 and training data 115. To facilitate use of the digital ledger 106, in some examples the computing nodes 104a-f can have access to a respective copy of the digital ledger 106 and their respective copies to validate transactions on the digital ledger 106. Examples of such transaction may include transfer or licensing of machine-learning model versions 114 or training data 115 for machine-learning models from one entity to another entity. In some examples, the computing nodes 104a-f can validate transactions by consensus, in which a new record is only added to the digital ledger 106 if many (e.g., a majority) of the computing nodes 104a-f agree that the record should be added. The computing nodes 104a-f may employ one or more consensus algorithms to reach such a consensus. Examples of the consensus algorithms can include proof of work, proof of stake, practical byzantine fault tolerance, proof of burn, proof of history, etc.

Machine-learning model versions 114 or training data 115 can be represented on the digital ledger 106 by one or more NFTs 112. In some examples, each machine-learning model version 114 and the training data 115 used to train the machine-learning model version 114 can be represented on the digital ledger 1065 by an individual NFT 112. As one example, the digital ledger 106 may include an NFT 112 representing a particular build of a supervised learning algorithm related to the lifespan of fixed-cutter drill bits. The NFT 112 may include other related information, such as a data set containing recorded lifespans of expired fixed-cutter drill bits that was used to train the supervised learning algorithm.

In some examples, an entity may wish to track ownership of a machine-learning model. To that end, the entity can operate a client device 118 (e.g., a laptop computer, desktop computer, server, mobile phone, or tablet) to transmit a request 120 via a network 122, such as the Internet, that may be distinct from the ledger network 102. The request 120 can be received by a server 124 hosting the online portal 126. The server 124 may be internal or external to the ledger network 102. In response to receiving the request 120, the server 124 can interface with the ledger network 102 to generate an NFT 112 representing the particular version 114 of the machine-learning model or the training data 115 used to train the machine-learning model version 114. For example, the server 124 can interact with one or more of the computing nodes 104a-f via the network 122 to initiate the generation of the NFT 112. The ledger network 102 can respond to said interactions by generating and storing the NFT 112 on the digital ledger 106. For example, the computing node 104a can generate a new record that includes the NFT 112 and coordinate with the other computing nodes 104b-f in the ledger network 102 to add the new record to the digital ledger 106.

The ledger network 102 can also store an identifier to the machine-learning model version 114 or the training data 115 on the digital ledger 106 and in relation to the NFT 112. For example, the ledger network 102 can store the identifier in the new record containing the NFT 112. In some examples, the identifier may be a hash value indicative of the machine-learning model version 114 or its training data 115. In some such examples, the user may be able to upload the machine-learning model version 114 or the training data 115 itself, some or all of which may be stored in its original format or another format (e.g., a hashed format) on the digital ledger 106. In some such examples, the user may be able to upload either the machine-learning model version 114 or the training data 115 via the online portal 126 for storage on the digital ledger 106, such as within the NFT 112. Alternatively, the identifier can identify a storage location from which the machine-learning model version 114 or the training data 115 can be retrieved, where the storage location is external to the digital ledger 106 and may be external to the ledger network 102. For example, the storage location can be a uniform resource indicator (URI) indicating the address of a website, repository, or server from which the machine-learning model version 114 or the training data 115 can be retrieved. The user may be able to input the identifier via the online portal 126 for use by the ledger network 102.

In some cases, the machine-learning model version 114 or the training data 115 can be confidential or otherwise indented to be kept secret from the public. But, the digital ledger 106, or another storage location for the machine-learning model version 114 or the training data 115 may be publicly accessible. It may therefore be desirable to protect the machine-learning model version 114 or the training data 115 from intentional or unintentional public disclosure. To that end, in some examples, the ledger network 102 can encrypt the machine-learning model version 114 or the training data 115 using one or more encryption techniques prior to storing the machine-learning model version 114 or the training data 115 in a storage location. For example, computing node 104a can encrypt the machine-learning model version 114 or the training data 115 using an encryption technique to generate an encrypted record of machine-learning model version 114 or an encrypted copy of the training data 115. The computing node 104a may then only store the encrypted data and not unencrypted data on the digital ledger 106. The encryption techniques may include asymmetric encryption techniques or symmetric encryption techniques. Examples of asymmetric encryption techniques can include Rivest Shamir Adleman (RSA), the Digital Signature Standard (DSS), Elliptical Curve Cryptography (ECC), etc. Examples of symmetric encryption techniques can include Advanced Encryption Standard (AES), Data Encryption Standard (DES), International Data Encryption Algorithm (IDEA), Blowfish, and Rivest Cipher 4 (RCV4). Encrypting the machine-learning model version 114 or the training data 115 can obfuscate it from the public or other unintended parties.

In some examples, the ledger network 102 can compress the machine-learning model version 114 or the training data 115 using one or more compression techniques prior to storing the machine-learning model version 114 or the training data 115 in the storage location. The compression may be performed additionally or alternatively to the encryption described above. For example, the computing node 104a can compress the machine-learning model version 114 or the training data 115. The computing node 104a may then only store the resulting compressed data, and not uncompressed data, on the digital ledger 106. Examples of the compression techniques can include Huffman coding, arithmetic coding, Burrows-Wheeler transform, Lempel-Zic compression, run-length encoding, etc. Compressing the machine-learning model version 114 or the training data 115 may be particularly useful in situations where the machine-learning model version 114 or the training data 115 is stored on the digital ledger 106, since the same machine-learning model version 114 or the training data 115 may be copied many times into many records over its lifespan on the digital ledger 106. By compressing the machine-learning model version 114 or the training data 115, the size of the digital ledger 106 may be reduced and consumption of computing resources (e.g., CPU, memory, and storage) by the ledger network 102 may also be reduced. This compression can yield faster transaction times because it may allow for record sizes (e.g., block sizes on the context of the digital ledger) to be reduced.

The ledger network 102 may also generate other information associated with the machine-learning model version 114 or the training data 115. For example, the ledger network 102 may generate metadata 116 indicating current ownership of the NFT 112, which can serve as a proxy ownership of the machine-learning model version 114 or the training data 115. The metadata 116 may also include one or more tags characterizing the machine-learning model version 114 or the training data 115. For example, tags related to the machine-learning model version 114 may indicate which entity the model version 114 was designed for, the type of algorithm the model version 114 utilizes, the size of the model version 114, the purpose of the model version 114, or other distinguishing characteristics. Similarly, tags related to the training data 115 may indicate which entity originally provided the training data 115. After generating the metadata 116, the ledger network 102 can store the metadata 116 in any suitable location. For example, the ledger network 102 can store some or all of the metadata 116 on the digital ledger 106 in relation to the NFT 112. In some such examples, some or all of the metadata 116 can be stored in the new record establishing the NFT 112. Additionally or alternatively, the ledger network 102 can store some or all of the metadata 116 in a database 110 or in another location that is external to the digital ledger 106.

Once the NFT 112 has been generated (or "minted") on the digital ledger 106, in some examples the ledger network 102 can transmit a response to the request 120 indicating that the NFT 112 has been generated. At this stage, the NFT 112 can serve as proof of ownership of the corresponding machine-learning model version 114 or the training data 115 on the digital ledger 106.

In some examples, the ledger network 102 can execute one more smart contracts 108a-b in relation to the NFT 112. Any number of smart contracts may be executable in relation to a given NFT 112. The smart contracts 108a-b can be used to automatically govern ownership of, access to, and payments related to the machine-learning model version 114 or the training data 115. For example, the smart contract 108a may enable a user to purchase ownership of the training data 115 automatically, without needing further intervention by the current owner. In some cases, the purchase may be approved in exchange for payment of a fee or for the provision of a service, such as access to the machine-learning model version 114. To enable this functionality, the smart contract can include program code that is executable to automatically generate a new record on the digital ledger 106 that transfers ownership of the corresponding NFT 112 from the current owner to the purchaser, for example in response to detecting the fee payment. If the training data 115 is encrypted, the smart contract 108a may also decrypt the encrypted well-log data and provide the decrypted data to the purchaser for use. The smart contract 108a can provide the decrypted data to the purchaser via email or another electronic communications medium. Alternatively, the smart contract 108a may provide the decryption key to the purchaser for use in decrypting the training data 115 themselves.

In the above licensing example, the license may be valid for a predefined licensing period (e.g., six months). The license may be automatically revoked by the smart contract 108a upon completion of that time period. For example, the smart contract 108a can include program code that is executable to automatically add a new record to the digital ledger 106 or update the database 110 to reflect that the license was revoked, in response to detecting the completion of the licensing period. If a decryption key for the training data 115 was provided to the licensee to provide the licensee with access to the training data 115, once the license is revoked, the smart contract 108a can be configured to automatically re-encrypt the training data 115 using a different key, so that the licensee can no longer access the data. The licensee may also be able to renew the license, for example, using an automated subscription service implemented using the smart contract 108a.

In an alternative example, a consumer license for the machine-learning model version 114 may be contingent on a consumer providing training data 115 to a model vendor. In some such example, the smart contract 108b can include program code that is executable to automatically add a new record to the digital ledger 106 or update the database 110 to reflect that the license was revoked in response to detecting insufficient training data 115. If a decryption key for the machine-learning model version 114 was provided to the consumer with access to the machine-learning model version 114, once the license is revoked, the smart contract 108b can be configured to automatically re-encrypt either the model version 114 or directions to the model version 114 using a different key, so that the consumer can no longer access the model version 114. The licensee may also be able to renew the license, for example, by providing training data 115 on a predetermined schedule specified in the smart contract 108b.

In some examples, a smart contract 108a can automatically govern whether the machine-learning model version 114 or the training data 115 is kept private or made public. For example, the smart contract 108a can include program code that is executable to automatically decrypt the machine-learning model version 114 or the training data 115 or otherwise make the machine-learning model version 114 or the training data 115 accessible to the public on a predefined date or after a predefined time period has passed.

The smart contracts 108a-b may be stored in any suitable location accessible to the ledger network 102. For example, some or all of the smart contracts 208a-b may be stored on the digital ledger 106b. Additionally or alternatively, some or all of the smart contracts 108a-b may be stored in the database 110. Regardless of their location, the smart contracts 108a-b can be accessed and executed by the ledger network 102. In some examples, the smart contracts 108a-b may be executed by one computing node 104a of the ledger network 102. In other examples, the smart contracts 108a-b may be executed by two or more of the computing nodes 104a-f working in cooperation.

In some examples, the smart contracts 108a-b that are applicable to a particular NFT 112 can be selected by its owner (e.g., the original or current owner). These selections can be made at the time the NFT 112 is created or at a later point in time via the online portal 126. The owner can update the list of applicable smart contracts 108a-b as desired, for example by adding additional smart contracts to or removing one or more of the existing smart contracts 108a-b from the list. In some examples, the owner can also customize the specific parameters usable by the smart contracts 108a-b in relation to their particular NFT 112, since the same smart contracts 108a-b may be executable in relation to multiple NFTs. Examples of such customizable parameters can include a purchasing cost, a licensing fee, a licensing period, an encryption or decryption method, auction options if the NFT 112 is to be sold by auction, or any combination of these. In other examples, the parameters may be fixed at the creation of the NFT 112 and unchangeable thereafter. In either case, the parameters may form part of the metadata 116 stored by the ledger network 102 in relation to the NFT 112.

In some examples, the online portal 126 can include an online marketplace for buying, licensing, and selling the machine-learning model version 114 or the training data 115. The marketplace may be searchable by users to locate the machine-learning model version 114 or the training data 115 that matches their search criteria. This search functionality may be facilitated by the tags in the metadata 116, as described above. The tags may be stored in an unencrypted manner to allow them to be readily searched. The tags can be analyzed based on the search criteria to filter through NFTs and provide relevant search results to the requestor. For example, the server 124 may receive a search request from a client device, where the search request is for identifying the machine-learning model version 114 associated with a particular function (e.g., completion-tool failure rates). In response to receiving the search request, the server 124 can filter through the tags assigned to a set of NFTs to identify which of the NFTs are associated with the particular function. The server 124 can then output the identified NFTs as the search results. Alternatively, the server 124 can forward the search request to a part of the ledger network 102, such as to computing node 104b. In response to receiving the search request, the ledger network 102 can perform the search and return the search results to the server 124, which can provide them back to the client device.

In some examples, one or more aspects of the computer system 100 may be implemented using cloud computing. Cloud computing can involve providing on-demand access to a shared pool of computing resources, such as computing power and data storage. As one specific example, the server 124 may be part of a cloud computing system for implementing the online portal 126. As another example, one or more of the computing nodes 104a-f may be part of one or more could computing systems. Cloud computing can yield improvements to robustness, scalability, and speed as compared to conventional approaches.

Figure 2:
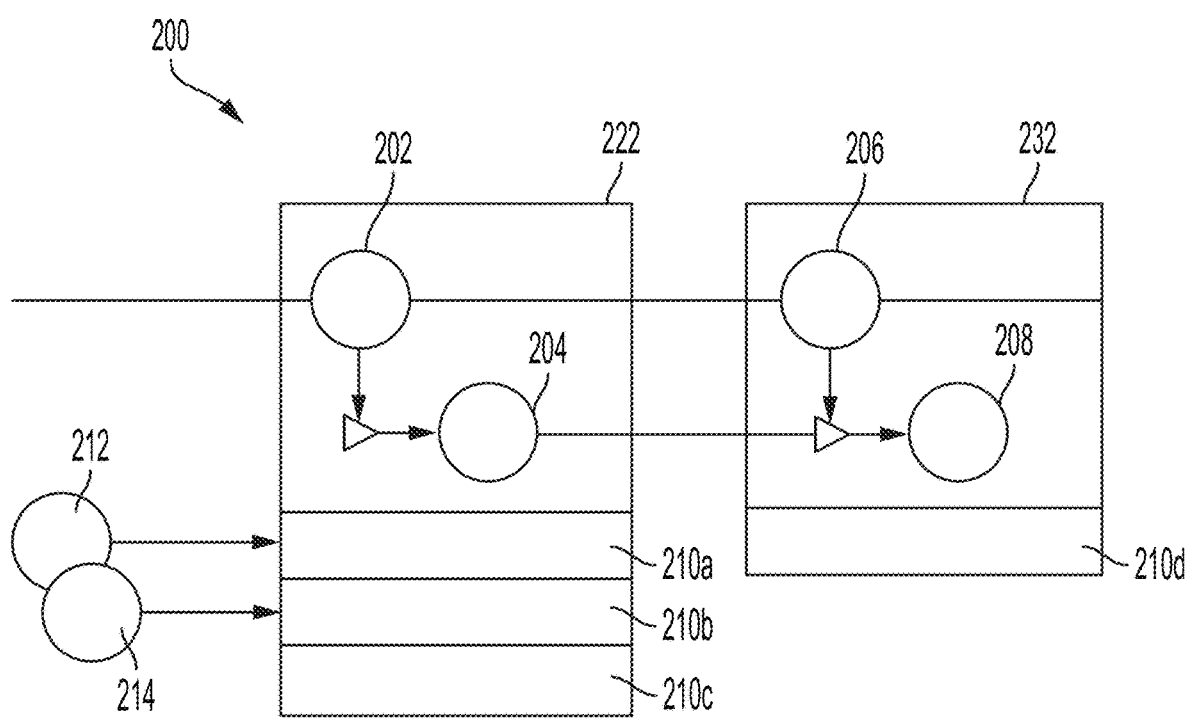
FIG. 2 is a block diagram of an example of a blockchain containing blocks with a hash function according to one example of the present disclosure.

FIG. 2 is a block diagram of an example of a blockchain 200 containing blocks 222, 232 according to one example of the present disclosure. The blocks 222, 232 can include training data sets 202, 206 and models 204, 208 that are trained using the training datasets 202, 206. The blocks 222, 232 can also include result data 210a-c indicating results generated by the models 204, 208 based on corresponding input data (e.g., input data 212, 214). The input data may also be stored in the blocks 222, 232 in some examples. In this way, the results 210a-d can be attributed to the models 204, 208 in the blocks 222, 232.

In some examples, hashed versions of the training datasets 202, 206 and models 204, 208 may be stored in the blocks 222, 232, rather than the training datasets 202, 206 and models 204, 208 themselves. The hashed versions may be generated using a hash function that can generate hash value outputs of a fixed length. The hashed versions of the training datasets 202, 206 and models 204, 208 may be unique values that, alone, may not divulge the original inputs, but may still serve as useful as a record of the original inputs. The hash function may be collision-free, meaning it may be highly unlikely for two different input sequences to produce the same hash value and an output. The hash function may produce outputs that may not divulge the original input sequence, even though the hash function may be known to the public. The opacity of hash function outputs may be achieved by an algorithm arranged to change multiple bits of a hash function in response to a single bit of an input, such as a training data set 202, 206 or a model 204, 208 being changed.

Figure 3:
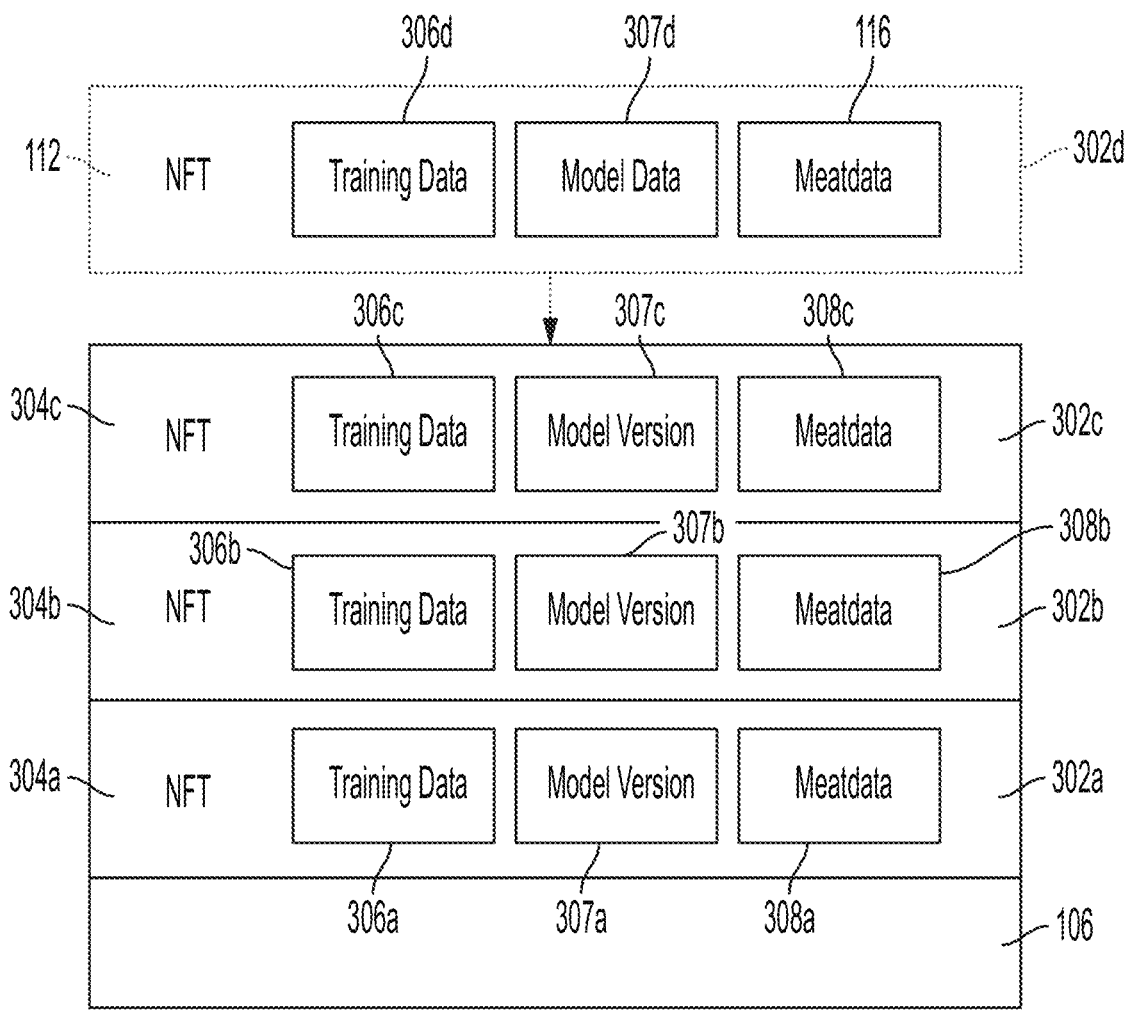
FIG. 3 depicts an example of a digital ledger that includes non-fungible tokens according to some aspects of the present disclosure.

FIG. 3 depicts an example of a digital ledger that includes non-fungible tokens according to some aspects of the present disclosure. In this example, the digital ledger 106 includes multiple records 302a-c. Each of the records 302a-c includes an NFT 304a-c. Each NFT 304a-c may include an encrypted version of the corresponding training data 306a-c, model version 307a-c, and the metadata 308a-c associated with the training data 306a-c and model version 307a-c. Each NFT 304a-c may additionally or alternatively include inputs to and corresponding outputs from the model version associated with that NFT. Each of the records may also include additional information (not shown for simplicity), such as a header value, a hash of the previous record's header value, a root of a hash tree (e.g., a Merkle tree), or any combination of these. This example is intended to be illustrative and non-limiting. Other examples may include more, less or different information than is shown in the records 302a-d. For instance, other examples may exclude the training data 306a-d, model version 307a-c, or the metadata 308a-d from some or all of the records 302a-d. Other examples may also store the training data 306a-d or model version 307a-c in an unencrypted format in some or all of the records 302a-d.

As shown in FIG. 3, a new record 302d can be added to an end of the digital ledger 106 for the NFT 112. The new record 302d can include the NFT 112, which may include an encrypted version of the training data 115, the corresponding metadata 116, and other information.

In some examples, each NFT 304a-c may include a storage location of the corresponding training data 306a-c or model version 307a-c, the corresponding training data or mode version being stored outside of the digital ledger. In some such examples, the NFT 112 of the new record 302d may also include a storage location of the corresponding training data 306d or model version 307d.

In some examples, a digital ledger 106 may include NFTs possessing a combination of storage solutions for training data 306a-c or model version 307a-c. For example, NFT 304a may contain training data 306a, effectively storing training data 306a on the digital ledger 106. In this same example, NFT 304b may contain a storage location of training data 306b, wherein training data 306b is stored remotely from the digital ledger 106.

Figure 4:
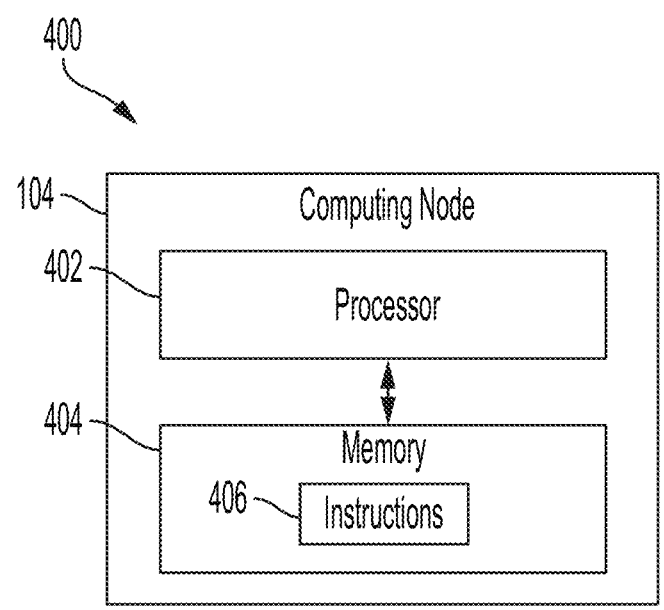
FIG. 4 depicts a block diagram of an example of a computing device for implementing some aspects of the present disclosure.

FIG. 4 is a block diagram of an example of a computing device 400 for implementing some aspects of the present disclosure. The computing device may correspond to any of the computer nodes 104a-f or the server 124 described above.

The computing device 400 can include a processor 402 communicatively coupled to a memory 404. The processor 402 is hardware that can include one processing device or multiple processing devices. Non-limiting examples of the processor 402 include a Field-Programmable Gate Array (FPGA), an application-specific integrated circuit (ASIC), or a microprocessor. The processor 402 can execute instructions 406 stored in the memory 404 to perform computing operations. The instructions 406 may include processor-specific instructions generated by a compiler or an interpreter from code written in any suitable computer-programming language, such as C, C++, C #, Python, or Java.

The memory 404 can include one memory device or multiple memory devices. The memory 404 can be volatile or can be non-volatile, such that it can retain stored information when powered off. Some examples of the memory 404 can include electrically erasable and programmable read-only memory (EEPROM), flash memory, or any other type of non-volatile memory. At least some of the memory 404 includes a non-transitory computer-readable medium from which the processor 402 can read instructions 406. A computer-readable medium can include electronic, optical, magnetic, or other storage devices capable of providing the processor 402 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions 406.

In some examples, the processor 402 can execute the instructions 406 to implement some or all of the functionality described herein. For example, the processor 402 cooperates with one or more of the computing nodes 104a-f of the ledger network 102 to operate a digital ledger 106 on which NFTs associated with the machine-learning model version 114 or training data 115 can be stored and transferred among owners. Additionally, the processor 402 may cooperate with the one or more computing nodes to execute smart contracts 108a-b, generate the online portal 126 described above, and perform other functionality.

Figure 5:
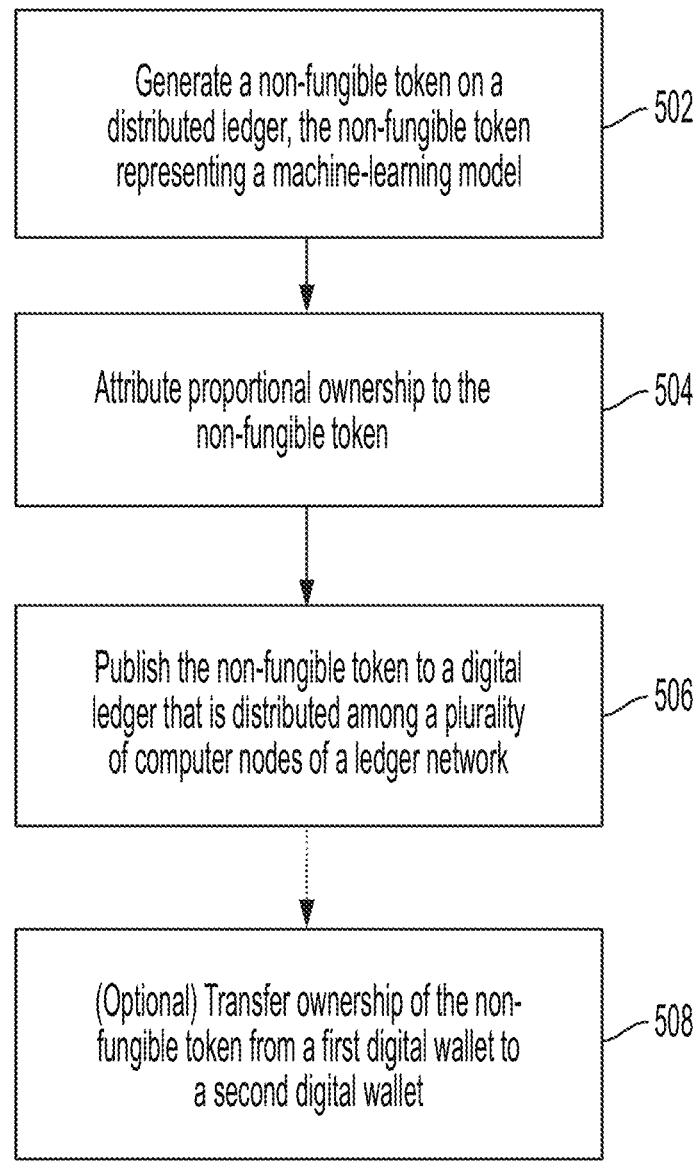
FIG. 5 depicts a flow chart of an example of a process for generating a non-fungible token in relation to a machine-learning model on a distributed ledger according to some aspects of the present disclosure.

In some examples, the processor 402 can implement the processes shown in FIG. 5 for generating a non-fungible token in relation to a machine-learning model on a distributed ledger. The processor 402 can also implement the process shown in FIG. 6 for determining access rights to a machine-learning model. Other examples may include more operations, fewer operations, different operations, or a different order of the operations shown in FIG. 5 or FIG. 6.

FIG. 5 depicts a flow chart of an example of a process for generating a non-fungible token in relation to a machine-learning model on a distributed ledger according to some aspects of the present disclosure.

In block 502, a processor 402 may generate a non-fungible token on a distributed ledger. The non-fungible token can represent a machine-learning model, for example a machine-learning model for use in performing hydrocarbon extraction operations. Hydrocarbon extractions operations may include exploration, drill site preparation, drilling, cementing, testing, completion, hydraulic fracturing, production, fracking fluid recycling, land restoration, equipment repairs, or logistical coordination. The non-fungible token can also include one or more identifiers of one or more training datasets used to train the machine-learning model. Examples of an identifier of a training dataset may include some or all of the training dataset itself, hash values of some or all of the training dataset, a name of the training dataset, or a reference to location on the distributed ledger or elsewhere at which the training dataset is stored.

In block 504, the processor 402 may attribute proportional ownership to the non-fungible token based on contributions of training datasets and contributions to the machine-learning model made by one or more entities. The processor 402 may be directed to attribute proportional ownership by a smart contract. The smart contract may contain instructions for the processor to attribute and adjust proportional ownership based on variables such as a given entity's adherence to certain conditions. Example conditions may include an entity's payment for a subscription or an entity's continued providing of training data.

In block 506, the processor may publish the non-fungible token to a digital ledger that is distributed among a plurality of computer nodes of a ledger network. The non-fungible token may be published in response to at least a subset of the computer nodes reaching a consensus decision to add the new record to the digital ledger. A consensus may be reached in the event many (e.g., a majority) of computing nodes within the ledger network agree that the NFT should be published. Examples of consensus algorithms can include proof of work, proof of stake, practical byzantine fault tolerance, proof of burn, proof of history, etc.

In block 508, the processor may execute an optional step of ownership transfer. Once the NFT has been stored on the digital ledger, it may be desirable to transfer ownership of the training data or machine-learning model version from a first entity to a second entity. The first entity can be the current owner of the training data or machine-learning model version. The second entity can be the new owner of either the training data or the machine-learning model version. To effectuate this transfer, the processor can add another record to the digital ledger describing a transaction of the NFT from a first digital wallet of the first entity to a second digital wallet of the second entity. Because the NFT serves as a proxy for ownership of the training data or the machine-learning model version, transferring the NFT from the first digital wallet to the second digital wallet can serve to transfer ownership of the training data or the machine-learning model version from the first entity to the second entity.

In some examples, the machine-learning model version can be used to control an operation. An example operation may be adjusting a drilling path during a drilling operation for extracting hydrocarbons from a geological formation. In some such example, a first entity may have previously gathered training data related to adjusting drilling paths in a geological environment similar to the geological environment being drilled in the present example. At a later point in time, the first entity may provide a second entity in possession of the machine-learning model version along with the training data related to adjusting drilling paths. In response to receiving the training data, an automated system of the second entity may subject the machine-learning model version to the training data so that the machine-learning model version may be improved and, in doing so, effectively become a new version of the machine-learning model. The resulting new machine-learning model version may then guide the adjusted drilling paths for the benefit of the second entity.

Figure 6:
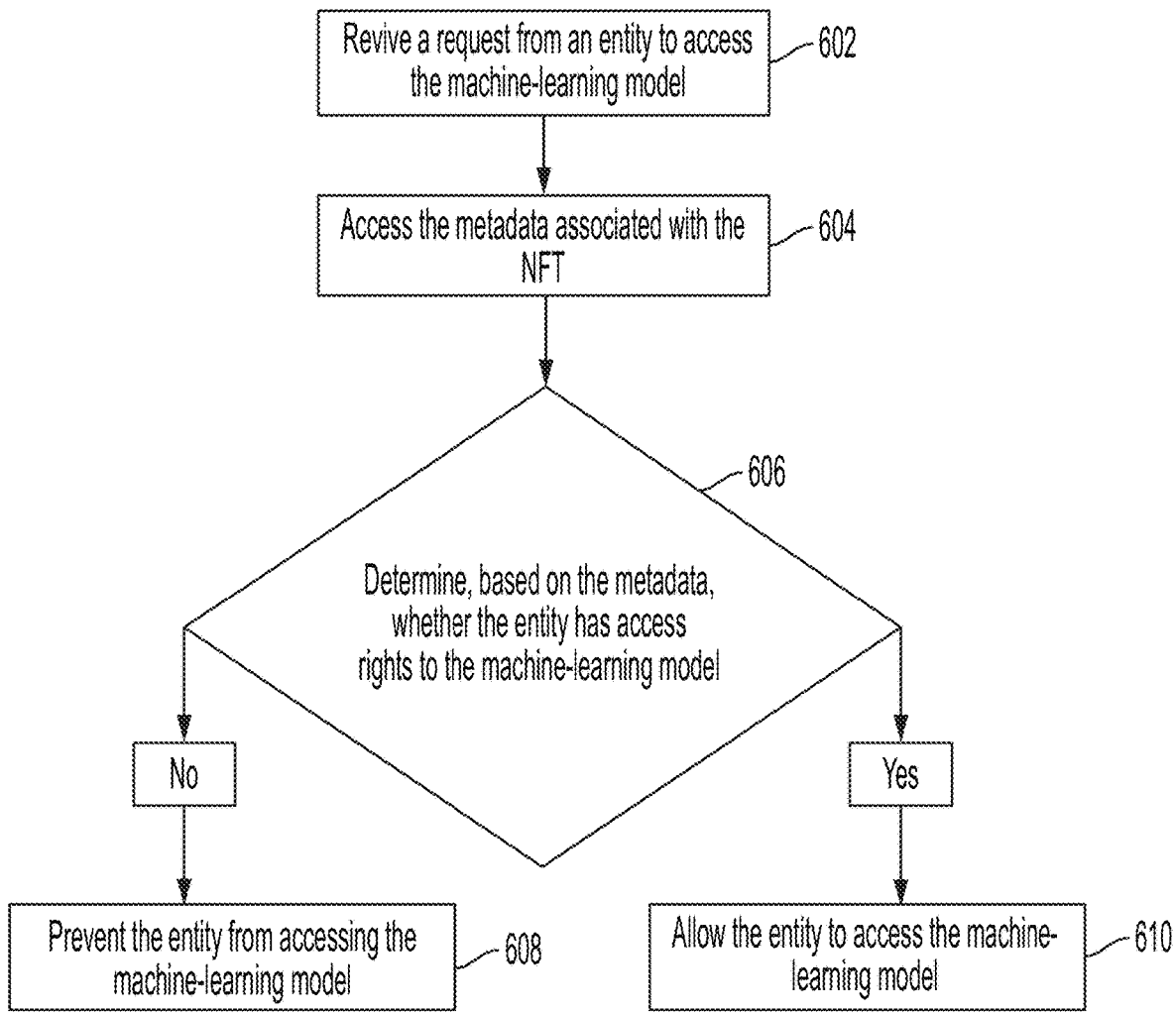
FIG. 6 depicts a flow chart of an example process for determining access rights to a machine-learning model according to some aspects of the present disclosure.

FIG. 6 depicts a flow chart of an example process for determining access rights to a machine-learning model according to some aspects of the present disclosure. The process may reference one or more non-fungible tokens on a distributed ledger to determine whether to grant or deny access. The one or more non-fungible tokens can correspond to a machine-learning model, such as a model for use in performing hydrocarbon extraction operations. The non-fungible token may include metadata that apportions ownership of the machine-learning model among a first entity associated with the first training dataset and a second entity associated with the second training dataset.

In block 602, the processor may receive a request from an entity to access a machine-learning model. The entity may be a third entity that is different from the first entity and the second entity. The processor may receive the request via a network, such as the internet. The request may be issued from an online portal. The online portal may be hosted by a server.

In block 604, the processor may determine a non-fungible token associated with the machine-learning model on a digital ledger and access the metadata associated with the non-fungible token. The processor may access the metadata via a network, such as the internet.

In block 606, the processor may determine, based on the metadata, whether the entity has access to the machine-learning model. The metadata may contain values (e.g., hash values) indicating which entities contributed in some way to the machine-learning model. For instance, the metadata may also contain hash values identifying the origin of the machine-learning model or the origin of the training datasets.

If the processor determines that the entity does not have access rights to the model, the process can proceed to block 608. Otherwise, the process can proceed to block 610.

In block 608, the processor may determine that the entity does not have access rights to the machine-learning model. In this instance, the processor may prevent the entity from accessing the machine-learning model. The entity may lack access rights because the entity has not paid a subscription, provided training data, or is seeking use of a machine-learning model trained at least in part with a dataset originating from a country that restricts or prohibits use of training data gathered within the country's jurisdiction from being used outside the country. Other reasons for restricting access are also possible. Some or all of the reasons for restriction can be acted upon automatically and specified within a smart contract.

Alternatively, in block 610, the processor may determine that the entity has access rights to the machine-learning model and allow the entity to access the machine-learning model. The entity may garner access by any combination of paying a recurring subscription, paying a licensing fee in a fixed number of installments, contributing training data to optimize the machine-learning model being accessed, or contributing training data to optimize another machine-learning model. Some or all of the reasons for granting access can be acted upon automatically and specified within a smart contract.

In some aspects, systems, methods, and non-transitory computer-readable medium for implementing some features described herein are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a system comprising: one or more processors; and one or more memories including program code that is executable by the one or more processors for causing the one or more processors to initiate execution of a smart contract that is configured to generate a non-fungible token on a distributed ledger, the non-fungible token representing a machine-learning model for use in performing hydrocarbon extraction operations, and the non-fungible token including one or more identifiers of one or more training datasets used to train the machine-learning model.

Example 2 is the system of example 1, wherein the non-fungible token includes a hashed representation of the machine-learning model, and wherein the one or more identifiers include hashed values of the one or more training datasets.

Example 3 is the system of any of examples 1-2, wherein the one or more training datasets includes at least a first training dataset and a second training dataset, and wherein the non-fungible token includes metadata that apportions ownership of the machine-learning model among a first entity associated with the first training dataset and a second entity associated with the second training dataset.

Example 4 is the system of any of examples 1-3, wherein the one or more memories including program code that is executable by the one or more processors for causing the one or more processors to: receive a request from an entity to access the machine-learning model, the entity being a third entity that is different from the first entity and the second entity; and in response to receiving the request: access the metadata associated with the non-fungible token; determine, based on the metadata, whether the entity has access rights to the machine-learning model; and based on determining that the entity does not have the access rights to the machine-learning model, prevent the entity from accessing the machine-learning model.

Example 5 is the system of any of examples 1-3, wherein the one or more memories including program code that is executable by the one or more processors for causing the one or more processors to: receive a request from an entity to access the machine-learning model, the entity being the first entity or the second entity; and in response to receiving the request: access the metadata associated with the non-fungible token; determine, based on the metadata, whether the entity has access rights to the machine-learning model; and based on determining that the entity has the access rights to the machine-learning model, allow the entity to access the machine-learning model.

Example 6 is the system any of examples 1-5, wherein the non-fungible token is a first non-fungible token, and wherein the one or more memories including program code that is executable by the one or more processors for causing the one or more processors to: initiate execution of the smart contract to generate a second non-fungible token on the distributed ledger, the second non-fungible token representing an updated version of the machine-learning model that was trained using at least one additional training dataset that is different from the one or more training datasets, the second non-fungible token being linked to the first non-fungible token to represent a relationship between the machine-learning model and the updated version of the machine-learning model, and the second non-fungible token including at least one identifier of the at least one additional training dataset that was used to train the updated version of the machine-learning model.

Example 7 is the system of any of examples 1-6, wherein the one or more memories including program code that is executable by the one or more processors for causing the one or more processors to execute the smart contract a plurality of times to generate a plurality of non-fungible tokens on the distributed ledger, each non-fungible token in the plurality of non-fungible tokens representing a respective version of the machine-learning model and including a respective set of metadata that attributes ownership of the respective version of the machine-learning model to one or more entities.

Example 8 is the system of any of examples 1-7, wherein the one or more memories including program code that is executable by the one or more processors for causing the one or more processors to publish records to the distributed ledger, the records describing inputs to the machine-learning model, and the records describing outputs from the machine-learning model as a result of the inputs.

Example 9 is the system of example 8, wherein the records include hashed versions of the inputs and hashed versions of the outputs.

Example 10 is the system of any of examples 1-9, wherein the distributed ledger is a blockchain distributed among a plurality of computer nodes of a blockchain network, the blockchain network being configured to reach a consensus decision before adding new records to the blockchain.

Example 11 is a computer-implemented method comprising generating a non-fungible token on a distributed ledger, the non-fungible token representing a machine-learning model for use in performing hydrocarbon extraction operations, and the non-fungible token including one or more identifiers of one or more training datasets used to train the machine-learning model.

Example 12 is the method of example 11, further comprising representing the machine-learning model as a hash value and representing the training datasets as hashed values on the distributed ledger.

Example 13 is the method of any of examples 11-12, further comprising apportioning ownership of the machine-learning model among a first entity associated with a first training dataset from the one or more training datasets and a second entity associated with a second training dataset from the one or more training datasets.

Example 14 is the method of any of examples 11-13, further comprising: receiving a request from an entity to access the machine-learning model, the entity being a third entity that is different from the first entity and the second entity; and in response to receiving the request: accessing metadata associated with the non-fungible token; determining, based on the metadata, whether the entity has access rights to the machine-learning model; and based on determining that the entity does not have access rights to the machine-learning model, preventing the entity from accessing the machine-learning model.

Example 15 is the method of any of examples 11-13, further comprising: receiving a request from an entity to access the machine-learning model, the entity being the first entity or the second entity; and in response to receiving the request: accessing metadata associated with the non-fungible token; determining, based on the metadata, whether the entity has access rights to the machine-learning model; and based on determining that the entity has the access rights to the machine-learning model, allowing the entity to access the machine-learning model.

Example 16 is the method of any of examples 11-15, further comprising initiating execution of a smart contract to generate a second non-fungible token on the distributed ledger, the second non-fungible token representing an updated version of the machine-learning model that was trained using at least one additional training dataset that is different from the one or more training datasets, the second non-fungible token being linked to a first non-fungible token to represent a relationship between the machine-learning model and the updated version of the machine-learning model, and the second non-fungible token including at least one identifier of the at least one additional training dataset that was used to train the updated version of the machine-learning model.

Example 17 is the method of any of examples 11-16, further comprising executing a smart contract a plurality of times to generate a plurality of non-fungible tokens on the distributed ledger, each non-fungible token in the plurality of non-fungible tokens representing a respective version of the machine-learning model and including a respective set of metadata that attributes ownership of the respective version of the machine-learning model to one or more entities.

Example 18 is the method of any of examples 11-17, further comprising publishing records to the distributed ledger, the records describing inputs to the machine-learning model, and the records describing outputs from the machine-learning model as a result of the inputs.

Example 19 is the method of any of examples 11-18, further comprising reaching a consensus decision before adding new records to the distributed ledger.

Example 20 is a non-transitory computer-readable medium comprising program code that is executable by one or more processors for causing the one or more processors to initiate execution of a smart contract that is configured to generate a non-fungible token on a distributed ledger, the non-fungible token representing a machine-learning model for use in performing hydrocarbon extraction operations, and the non-fungible token including one or more identifiers of one or more training datasets used to train the machine-learning model.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
one or more processors; and
one or more memories including program code that is executable by the one or more processors for causing the one or more processors to initiate execution of a smart contract that is configured to generate a non-fungible token on a distributed ledger, the non-fungible token representing a machine-learning model for use in performing hydrocarbon extraction operations, and the non-fungible token including one or more identifiers of one or more training datasets used to train the machine-learning model.

2. The system of claim 1, wherein the non-fungible token includes a hashed representation of the machine-learning model, and wherein the one or more identifiers include hashed values of the one or more training datasets.

3. The system of claim 1, wherein the one or more training datasets includes at least a first training dataset and a second training dataset, and wherein the non-fungible token includes metadata that apportions ownership of the machine-learning model among a first entity associated with the first training dataset and a second entity associated with the second training dataset.

4. The system of claim 3, wherein the one or more memories including program code that is executable by the one or more processors for causing the one or more processors to:
receive a request from an entity to access the machine-learning model, the entity being a third entity that is different from the first entity and the second entity; and
in response to receiving the request:
access the metadata associated with the non-fungible token;
determine, based on the metadata, whether the entity has access rights to the machine-learning model; and
based on determining that the entity does not have the access rights to the machine-learning model, prevent the entity from accessing the machine-learning model.

5. The system of claim 3, wherein the one or more memories including program code that is executable by the one or more processors for causing the one or more processors to:
receive a request from an entity to access the machine-learning model, the entity being the first entity or the second entity; and
in response to receiving the request:
access the metadata associated with the non-fungible token;
determine, based on the metadata, whether the entity has access rights to the machine-learning model; and
based on determining that the entity has the access rights to the machine-learning model, allow the entity to access the machine-learning model.

6. The system of claim 1, wherein the non-fungible token is a first non-fungible token, and wherein the one or more memories including program code that is executable by the one or more processors for causing the one or more processors to:
initiate execution of the smart contract to generate a second non-fungible token on the distributed ledger, the second non-fungible token representing an updated version of the machine-learning model that was trained using at least one additional training dataset that is different from the one or more training datasets, the second non-fungible token being linked to the first non-fungible token to represent a relationship between the machine-learning model and the updated version of the machine-learning model, and the second non-fungible token including at least one identifier of the at least one additional training dataset that was used to train the updated version of the machine-learning model.

7. The system of claim 1, wherein the one or more memories including program code that is executable by the one or more processors for causing the one or more processors to execute the smart contract a plurality of times to generate a plurality of non-fungible tokens on the distributed ledger, each non-fungible token in the plurality of non-fungible tokens representing a respective version of the machine-learning model and including a respective set of metadata that attributes ownership of the respective version of the machine-learning model to one or more entities.

8. The system of claim 1, wherein the one or more memories including program code that is executable by the one or more processors for causing the one or more processors to publish records to the distributed ledger, the records describing inputs to the machine-learning model, and the records describing outputs from the machine-learning model as a result of the inputs, wherein the records further include hashed versions of the inputs and outputs.

9. The system of claim 1, wherein the distributed ledger is a blockchain distributed among a plurality of computer nodes of a blockchain network, the blockchain network being configured to reach a consensus decision before adding new records to the blockchain.

10. A computer-implemented method comprising generating a non-fungible token on a distributed ledger, the non-fungible token representing a machine-learning model for use in performing hydrocarbon extraction operations, and the non-fungible token including one or more identifiers of one or more training datasets used to train the machine-learning model.

11. The method of claim 10, further comprising representing the machine-learning model as a hash value and representing the training datasets as hashed values on the distributed ledger.

12. The method of claim 10, further comprising apportioning ownership of the machine-learning model among a first entity associated with a first training dataset from the one or more training datasets and a second entity associated with a second training dataset from the one or more training datasets.

13. The method of claim 12, further comprising:
receiving a request from an entity to access the machine-learning model, the entity being a third entity that is different from the first entity and the second entity; and
in response to receiving the request:
accessing metadata associated with the non-fungible token;
determining, based on the metadata, whether the entity has access rights to the machine-learning model; and
based on determining that the entity does not have the access rights to the machine-learning model, preventing the entity from accessing the machine-learning model.

14. The method of claim 12, further comprising:
receiving a request from an entity to access the machine-learning model, the entity being the first entity or the second entity; and
in response to receiving the request:
accessing metadata associated with the non-fungible token;
determining, based on the metadata, whether the entity has access rights to the machine-learning model; and
based on determining that the entity has the access rights to the machine-learning model, allowing the entity to access the machine-learning model.

15. The method of claim 10, further comprising initiating execution of a smart contract to generate a second non-fungible token on the distributed ledger, the second non-fungible token representing an updated version of the machine-learning model that was trained using at least one additional training dataset that is different from the one or more training datasets, the second non-fungible token being linked to a first non-fungible token to represent a relationship between the machine-learning model and the updated version of the machine-learning model, and the second non-fungible token including at least one identifier of the at least one additional training dataset that was used to train the updated version of the machine-learning model.

16. The method of claim 10, further comprising executing a smart contract a plurality of times to generate a plurality of non-fungible tokens on the distributed ledger, each non-fungible token in the plurality of non-fungible tokens representing a respective version of the machine-learning model and including a respective set of metadata that attributes ownership of the respective version of the machine-learning model to one or more entities.

17. The method of claim 10, further comprising publishing records to the distributed ledger, the records describing inputs to the machine-learning model, and the records describing outputs from the machine-learning model as a result of the inputs.

18. The method of claim 10, further comprising reaching a consensus decision before adding new records to the distributed ledger.

19. A non-transitory computer-readable medium comprising program code that is executable by one or more processors for causing the one or more processors to initiate execution of a smart contract that is configured to generate a non-fungible token on a distributed ledger, the non-fungible token representing a machine-learning model for use in performing hydrocarbon extraction operations, and the non-fungible token including one or more identifiers of one or more training datasets used to train the machine-learning model.

20. The system of claim 1, wherein proportional ownership of the machine-learning model is attributed using the non-fungible token based on contributions made by one or more entities with respect to the machine-learning model or the one or more training datasets.

* * * * *